May 19, 1959     F. L. LE BUS, SR     2,887,162
AUTOMATIC RELEASABLE FISHING APPARATUS
Filed Feb. 24, 1956     5 Sheets-Sheet 1

Fig. 1-A

INVENTOR.
F. L. Le Bus Sr.
BY
ATTORNEY

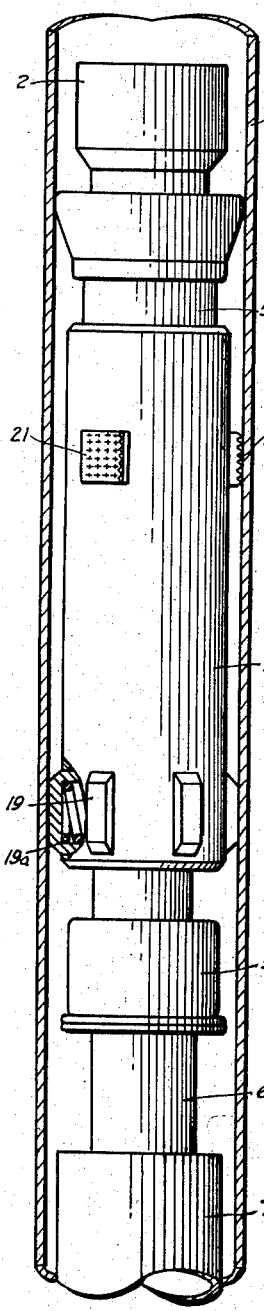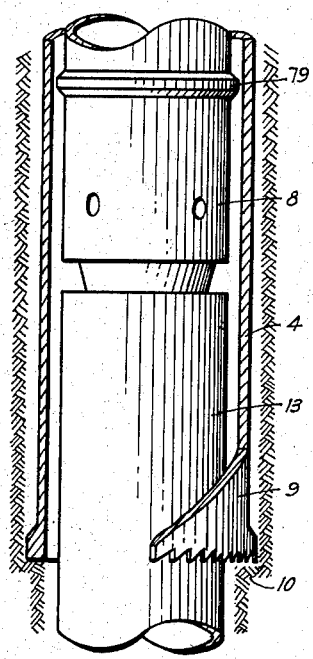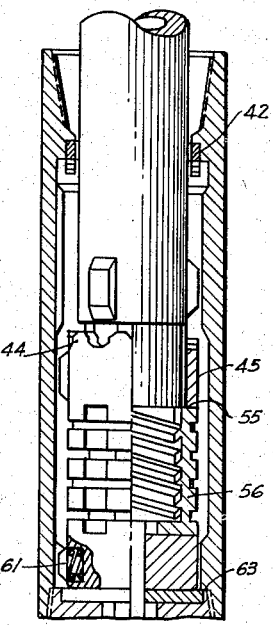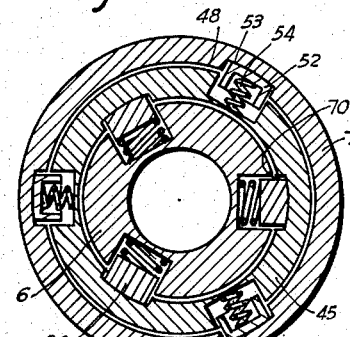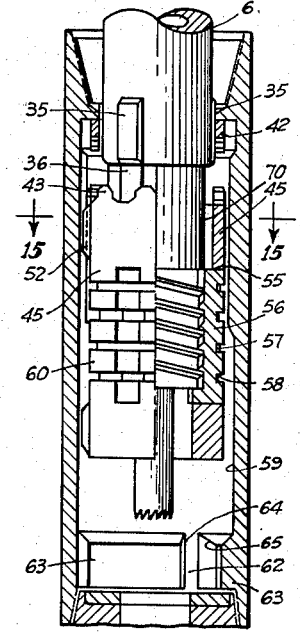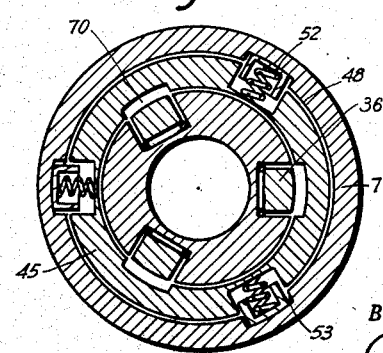

May 19, 1959   F. L. LE BUS, SR   2,887,162
AUTOMATIC RELEASABLE FISHING APPARATUS
Filed Feb. 24, 1956   5 Sheets-Sheet 4
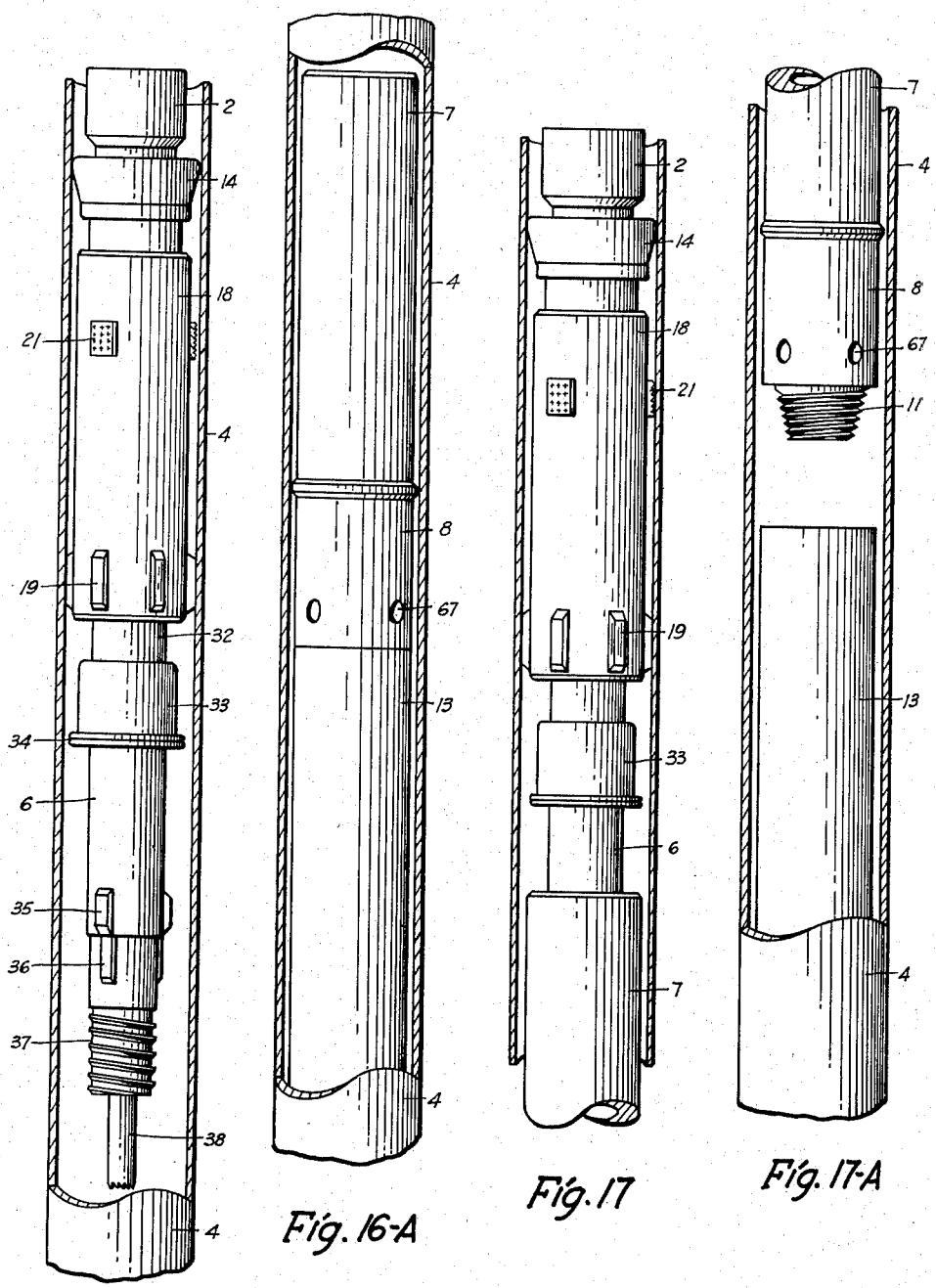
Fig. 16   Fig. 16-A   Fig. 17   Fig. 17-A
INVENTOR.
F. L. Le Bus Sr.
BY
ATTORNEY

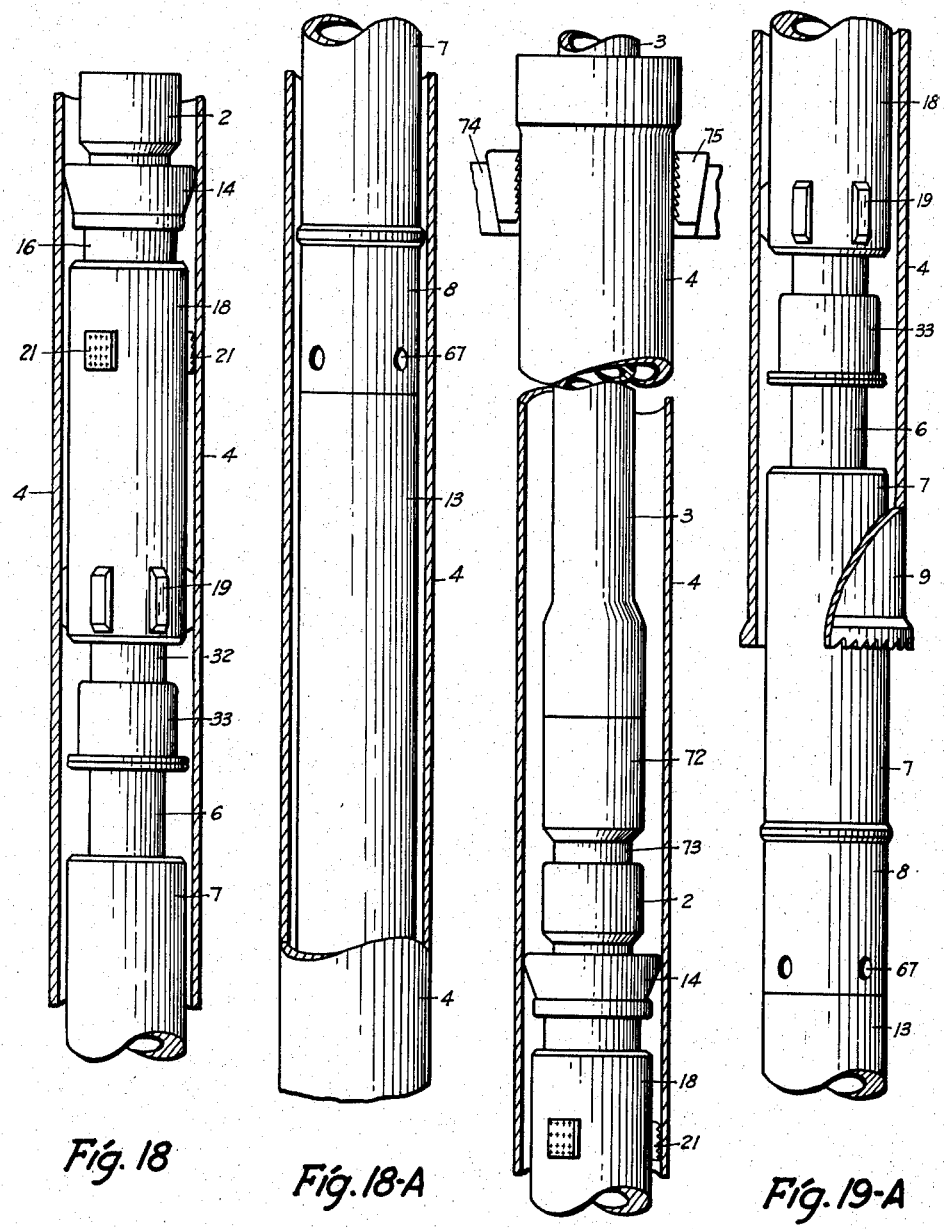

United States Patent Office 2,887,162
Patented May 19, 1959

2,887,162

AUTOMATIC RELEASABLE FISHING APPARATUS

Franklin L. Le Bus, Sr., Longview, Tex., assignor to Wash Overshot & Spear Engineers, Inc., a corporation of Texas Application February 24, 1956, Serial No. 567,700

11 Claims. (Cl. 166—103)

This invention relates to improvements in fishing tools for oil wells and more particularly, but not by way of limitation, to a combination reaming and retrieving apparatus for loosening stuck drill pipe or collars and pulling them from an oil well. This application is an improvement over applicant's co-pending applications, Serial No. 393,711 filed November 23, 1953 now Patent No. 2,804,151, Serial No. 405,186 filed January 20, 1954, Serial No. 463,554 filed October 20, 1954, and Serial No. 487,682 filed February 11, 1955.

In the present day rotary drilling of oil wells, a drilling string comprising a plurality of drilling pipe sections secured in tandem relation is disposed in the well bore. The lower portion of the drilling string is usually provided with a varying number of drill collars having a drill bit on the lower end thereof for drilling the subsurface formation upon rotation of the drilling string. The drilling string is secured at the surface of the well to a kelly and rotary table causing rotation of the string in the well bore.

Drill collars utilized in rotary drilling are usually heavy, rigid tubular members which are difficult to flex or bend and in drilling in certain formations, such as hard chert or limestone or what is commonly called tilted geological formations, the drill bit may be deflected from its true vertical course in the well bore and caused to drill a crooked bore. In such an operation, the rigid drill collars will rub against the side of the well bore and form an off-set recessed portion, commonly called a "key seat." In deeper wells, the bore will usually contain several of these off-set key seat portions and when it is necessary to remove the drill bit from the bore, the bit will usually become lodged in one of these key seats since they are of smaller diameter than the well bore proper and the over-all diameter of the drill bit. It then becomes necessary to disconnect and remove a substantial portion of the drill pipe and collars from the well bore, leaving the stuck drill bit and a few (usually two or more) drill collars in the well bore. In order to free the stuck collars and bit, a wash-over string having a reaming tool on the lower end thereof is run into the well bore, and reams around the key seat and stuck pipe in order to free the drill bit. In most present day apparatuses, when this is done the stuck drill bit and collars upon being loosened will fall to the bottom of the well bore, sometimes causing serious damage to the bit and also necessitating running another set of fishing tools into the bore for removing the loosened collars and bit.

The present invention contemplates a novel fishing tool apparatus adapted to release and remove lodged drill bit and collars in one trip of the fishing tool into the well bore without causing damage to the bit or collars. The retrieving or fishing apparatus is carried in the wash-over string and engages the uppermost lodged drill collar prior to the wash-over pipe being telescoped over the drill collars for the reaming operation. A reaming shoe on the lower end of the wash-over pipe is provided for freeing the lodged bit and collars and substantially simultaneously with the loosening thereof, the drill collars and bit are prevented from dropping to the bottom of the well bore by an automatic engagement of the retrieving apparatus carried with the wash-over pipe, so that they may be subsequently removed from the well bore. Furthermore, the present invention precludes any possibility of accidental disconnection of any of the connecting portions of the pulling apparatus, thereby assuring that the fishing tool is maintained in proper connecting relationship with the stuck drill collars until it is ready for release therefrom.

The present invention further distinguishes from applicant's prior applications by eliminating any vertical hunting action on the part of the apparatus in order to place it in the proper longitudinal position for release or re-engagement of the upper portion of the apparatus from the lower portion thereof. The present structure eliminates substantial longitudinal movement once the upper stem is moved into a definite position to permit an unthreading of the spear stem unit from a lower unit connecting with the collar. The present invention is similar to the prior applications in that after the drill collars are loosened and it is still difficult to remove them with the wash-over string, the loosened drill collars may then be lowered to the bottom of the well bore and the fishing or retrieving apparatus may be separated to permit insertion of an independent fishing apparatus.

It is an important object of this invention to provide a fishing tool apparatus for loosening lodged drill collars in an oil well bore which provides a reaming action while simultaneously precluding a substantial downward movement of the drill collars upon being dislodged by the reaming action.

And still another object of this invention is to provide a fishing tool apparatus for dislodging and recovering stuck drill collars in a well bore by one operation of running the tools in the well bore.

And still another object of this invention is to provide a drill collar retrieving mechanism supported in a wash-over string for engagement with stuck drill collars in a well bore and which may be mechanically disconnected therefrom to permit removal of the retrieving mechanism with the wash-over string.

And still another object of this invention is to provide a drill collar retrieving apparatus supported in a wash-over pipe which may be engaged and disengaged with the lodged drill collars automatically without a special operating collar or nipple as part of the wash-over string.

And still another object of this invention is to provide a releasable fishing tool apparatus supported in a wash-over string for reaming around stuck drill collars in a well bore where the fishing apparatus may be readily connected or disconnected by direct right or left hand rotation respectively with any threaded joint below the fishing apparatus.

And still another object of this invention is to provide a fishing tool apparatus supported in a wash-over reaming string for loosening stuck drill collars in a well bore which precludes a plurality of longitudinal movements by an upper stem portion of the apparatus in order to place the tool in a proper position for release of the upper stem portion thereof from a lower connecting portion engageable with the stuck drill collar, thereby eliminating vertical hunting on the part of the tool during release and re-engagement of the upper stem portion from the lower engaging portion of the fishing tool apparatus.

An additional object of this invention is to provide a drill collar fishing tool apparatus supported in a wash-over string for reaming around stuck drill collars in a well bore where the fishing tool will engage the drill collars prior to a reaming action of the wash-over string, thereby preventing possibility of premature loosening of the drill collar before engagement with the retrieving apparatus.

And still another object of this invention is to provide a fishing tool apparatus supported in a wash-over string for engaging and holding stuck drill collars that are loosened by the wash-over string which provides positive engagement of the fishing tool with the stuck collars yet affords easy coupling and uncoupling of the fishing tool apparatus from the stuck drill collars when it is desired to do so and thereby providing a simple and economical tool that has sufficient flexibility for variable types of operations.

Other objects and advantages of the invention will be evident from the following detailed description, read in conjunction with the accompanying drawings, which illustrate my invention.

In the drawings:

Figure 1A is a continuation of Fig. 1 showing the lower portion of the spear mandrel and particularly the safety stem therefor.

Figure 11 is a sectional elevational view of the wash-over pipe shown disposed in the well bore with the fishing tool apparatus shown supported therein in elevation.

Figure 11A is a view similar to Fig. 11 depicting a continuation of the lower end portion of the apparatus shown in Fig. 11.

Figure 12 is a view similar to Fig. 4 showing another disposition of the safety stem element in the swivel housing.

Figure 13 is a similar view to Fig. 12 showing still another position of the safety stem unit in the swivel housing.

Figure 14 is a view taken on lines 14—14 of Fig. 3.

Figure 15 is a view taken on lines 15—15 of Fig. 13.

Figures 16 and 16A are views similar to Figs. 11 and 11A showing the safety spear unit in a position of release from the swivel housing engaging the stuck drill collar.

Figures 17 and 17A are views similar to Figs. 16 and 16A showing the complete fishing apparatus in a position of release or disengagement above the stuck drill collar.

Figures 18 and 18A are views similar to Figs. 17 and 17A showing the complete fishing tool apparatus in re-engaged position with the stuck drill collar.

Figures 19 and 19A are views similar to Figs. 18 and 18A showing the manner in which the wash pipe is hung from the surface of the well and also the drilling string supporting the fishing tool apparatus therein.

Figure 1:
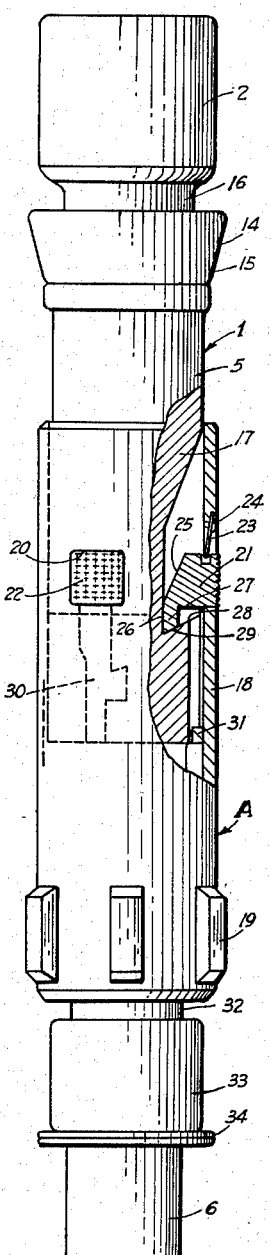
Figure 1 is a vertical elevational view with certain parts in section showing the upper spear mandrel portion of the fishing tool.
Figure 2:
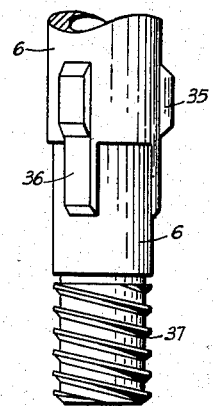
Figure 2 is an elevational view partly in section of the swivel barrel housing and lower sub-member of the fishing tool.
Figure 2:
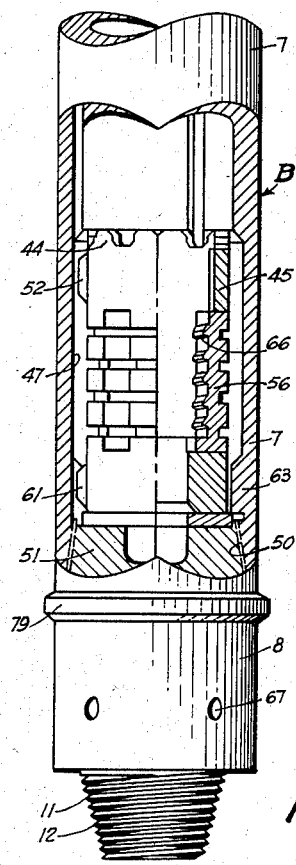

Referring to the drawings in detail, and particularly Figs. 1 to 11A, inclusive, the fishing tool apparatus generally indicated at 1 comprises an upper tool box 2 adapted to be connected with a string of drill pipe 3 (Fig. 19) for supporting the tool in a wash-over pipe 4. The term wash-over pipe is for pipe of slightly larger diameter than the fishing tool apparatus and the drill casing in order to be inserted in the bore hole thereover. A reaming tool is usually attachable at the lower end thereof, and such term is common vernacular in the oil industry.

Referring to Figs. 1, 2, 11 and 11A, the fishing tool apparatus 1 usually comprises an upper portion designated A comprising a spear mandrel 5 and a connecting safety stem 6 cooperating with the lower portion B (Fig. 2) comprising a swivel barrel or housing 7 and a connecting lower circulating sub-member 8. The assembled unit as shown in Figs. 11 and 11A is adapted to be supported in the wash pipe 4 substantially conterminous with the lower end thereof at which is carried any suitable reaming tool 9 having reaming teeth 10 thereon. The circulating sub 8 is provided with a tapered pin member 11 having threads 12 engageable with a threaded box (not shown) of a stuck drill collar 13 in the well bore, such as shown in Figs. 11A, 18A and 19A.

The upper portion A of the fishing tool apparatus as depicted in Figs. 1 and 1A comprises a suitable packing ring 14 having a tapered outer periphery 15 and surrounding the upper portion of the mandrel 5 into which a cylindrical portion 16 of the tool box 2 is adapted to be secured therein. The spear mandrel 5 is provided with a plurality of tapered flat side portions 17 acting as tapered seats for a purpose as will be hereinafter set forth. A slip housing or tubular cage member 18 encircles the mandrel 5 at a point substantially adjacent the tapered seat portions 17. The lower portion of the housing 18 is provided with a plurality of circumferentially spaced friction dogs 19 each of which is urged outwardly by any suitable spring member 19a as is well known in the art.

The cylindrical housing 18 is provided with a plurality of circumferentially spaced apertures or windows 20 in each of which is disposed a movable slip member 21 having serrations or teeth 22 on the outer face thereof. The slip members 21 are each secured to the housing 18 by a holding spring 23 and a set screw 24 secured to the housing 18. Each of the slips is provided with an inner tapered face 25 connected with a lower straight vertical face 26 for a purpose as will be hereinafter set forth. The slips are provided with a downwardly extending leg portion 27 adapted to cooperate with an undercut groove forming a shoulder portion 28 provided on the mandrel 5. The lower portion of the leg 27 is beveled at 29 to permit cooperation between the leg 27 and the shoulder 28.

Figure 5:
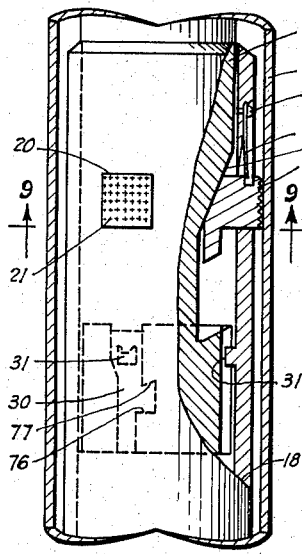
Figure 5 is a detail view of portions of the spear mandrel and wash pipe shown partly in section and with certain elements shown in dotted lines for clarity.
Figure 7:
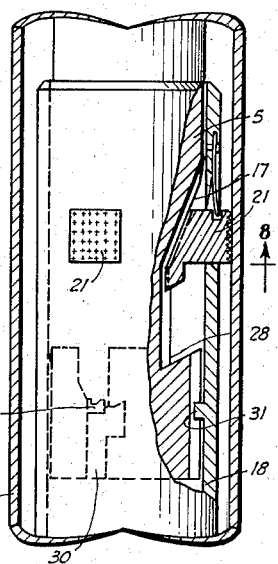
Figure 7 is a view similar to Fig. 5 showing the action of the slip elements with the tapered surfaces of the spear mandrel during a rotation of the tool apparatus.
Figure 6:
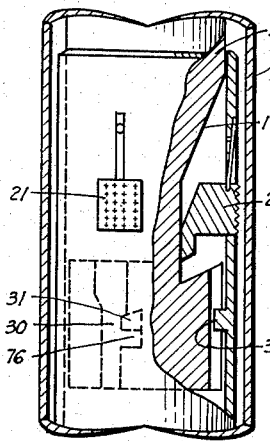
Figure 6 is a similar view to Fig. 5 showing a different position of the slip elements therein.
Figure 9:
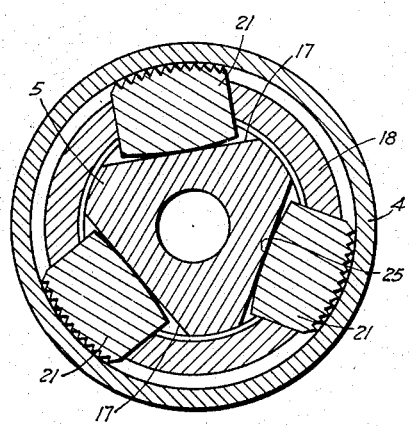
Figure 9 is a view taken on lines 9—9 of Fig. 5.
Figure 10:
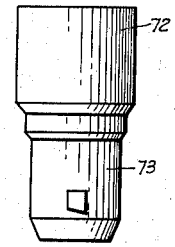
Figure 10 is a detail view of the lower end of a latching tool providing a connection between the fishing apparatus and the drill string.

The mandrel 5 at a point substantially adjacent the shoulder portion 28 is provided with a plurality of circumferentially spaced longitudinally disposed key ways 30 shown in dotted lines in Figs. 1, 5, 6 and 7. The mandrel housing 18 is provided with a plurality of circumferentially spaced inwardly directed lugs 31 in order that a respective lug 31 may be disposed in a key way 30. It will be apparent that the movement of the slips 21 from an inward position such as shown in Figs. 1 and 6 to an expanded outer position against the inner wall of the wash-over pipe 4 such as shown in Figs. 5 and 7 is dependent upon the position from the slip housing 18 with respect to the tapered seats 17 of the spear mandrel 5. The keys 31 cooperating with the key ways 30 function to keep the slips 21 in alignment with the tapered seats 17 (Fig. 9). Furthermore, the key ways serve as a lock for maintaining the slips in locked position during any longitudinal movement of the fishing apparatus in the wash-over string, such as shown in Fig. 6.

The expandible dogs 19 at the lower end of the slip housing 18 are engageable with the inner wall of the wash-over pipe 4 at all times, thereby providing movement of the housing 18 simultaneously with vertical movement such as raising or lowering of the wash-over pipe 4.

The lower end 32 of the spear mandrel is connected with the safety stem 6 through a suitable coupling member 33 (Figs. 1, 11 and 17). A wear plate 34 is interposed between the coupling 33 and the top of the tubular safety stem 6. As shown in Fig. 1A, the safety stem is provided with a plurality of circumferentially spaced expandible friction dogs 35 having lower leg portions 36 of reduced size in depth. The dogs 35 are expanded in the same manner as the dogs 19 by suitable springs (not shown). The lower end of the stem 6 is provided with buttress threads 37. A lower projecting member 38 extends downwardly from the threaded portions 37.

The lower half of the fishing tool designated B, and comprising the swivel housing 7 and circulating sub member 8 (Fig. 2) is adapted to cooperate with the upper portion A of the fishing apparatus as will be hereinafter set forth. The cylindrical housing 7 is provided with an upper tapered bore 39 (Figs. 3 and 4) providing inwardly directed shoulders 40 having an annular groove or undercut 41 into which an upper clutch ring 42 is press fit. The clutch ring 42 is provided with a plurality of downwardly directed clutch teeth or dogs 43 adapted to cooperate with the clutch teeth 44 provided on an automatic nut housing 45 as will be hereinafter set forth. A plurality of circumferentially spaced set screws 49 assist in securing the clutch ring 42 in the housing 7. The housing 7 below the shoulders 40 is provided with a bore 46 of smaller diameter and communicating with a bore 47 of larger diameter. The bore 46 is provided with inwardly directed flange portions 48 having a plurality of circumferentially equally spaced (preferably three) longitudinal slots or key ways 53 running substantially from the upper end to the lower end of the flange 48 adjacent the larger diametered bore portion 47.

It will be apparent that the housing 7 is provided with a suitable threaded box 50 cooperating with a pin 51 of the lower sub 8. The sectional construction is preferred in order to permit assembly of the various elements within the swivel housing 7 and particularly the automatic nut cage housing 45 carried thereby to make up with the threaded portion 37 of the safety stem 6 as will be hereinafter set forth.

The cylindrical housing 45 is slidably disposed in the bore of the swivel housing 7 and is provided with a plurality of circumferentially spaced outwardly projecting dogs or key members 52 adapted to be disposed in the circumferentially spaced key slots 53 of the flange 48 (Figs. 14 and 15). The dogs 52 are preferably of the expandible type urged in an outwardly expanding direction by helical springs 54 as is well known. The tubular housing 45 is provided with a plurality of circumferentially spaced recesses or windows 55 in which are disposed circumferentially spaced slip members 56 (Figs. 3, 4, 12 and 13). The slip members are expandible and are maintained in the windows 55 by a plurality of circular split ring members 57 disposed in a plurality of vertically spaced annular grooves 58 on the outer periphery of each slip member 56. If preferred, the top and bottom faces of the recesses 55 may be slightly tapered to prevent complete movement of the slips 56 inwardly of the housing 45, but the spring members 57 permit an expansion outwardly to permit insertion of the threaded stem 6. It is preferred that three of the circumferential windows and slips be provided, but not limited thereto.

The lower portion of the housing 45 (Figs. 2, 4, 12 and 13) is provided with a plurality of outwardly projecting latch members 61 which are preferably spring urged in a manner as previously mentioned. The dogs or latches 61 are adapted for disposition in a plurality of longitudinal slots or key ways 62 (only one of which is shown) provided in an inwardly directed lower flange portion 63 of the swivel housing 7. The slots 62 have a straight face 64 on one side and an opposite tapered face 65 on the opposite side (Figs. 3 and 13) so that they will permit rotation of the stem 6 in a right hand direction only when disposed in a lowermost position in the swivel housing 7.

It will be apparent that the upper and lower assemblies A and B may be connected at the surface of the well with the safety stem 6 and its threads 37 inserted into the swivel housing 7 into threaded connection with the complementary threads 66 of the housing 45. A straight rectilinear movement of the stem 6 into the housing 45 will permit connection of the threads due to the expansible feature of the circumferentially spaced members 56. However, the buttress threads are of a design to prevent disconnection therebetween without rotation in one direction. The threads 37 and 66 are preferably left hand threads for a purpose as will be hereinafter set forth.

The mandrel 5, stem 6 of the upper unit A, as well as the swivel housing 7, tubular housing 45 and lower sub member 8 of the lower unit B are of a substantially tubular construction to permit the circulation of the well fluid through the tool in a manner which is well known in the industry. The operating well fluid is confined by the packer 14 to flow through the tool and is discharged from the outlet ports 67 and into the annulus between the outer periphery of the tool and the well bore for the purpose of assisting in the loosening of the stuck drill collar.

OPERATION

Initial engagement

Referring to Figs. 1, 1A, 17 and 17A, the spear mandrel 5 and safety stem 6 of the upper unit A are connected with the swivel housing 7 (Fig. 3) of the lower unit B and both units are supported or anchored in the wash pipe 4 by the friction dogs 19 and the slips 21 which are engaging the inner wall of the wash pipe 4 for supporting the fishing tool unit therein. It will be apparent that the slips 21 are positioned substantially adjacent the tapered seat 17 to effect an outward movement thereof against the inner wall of the wash pipe 4 thereby anchoring the complete unit within the wash pipe 4. As the wash pipe 4 and fishing unit 1 are moved downwardly into the well, a right hand rotation of the wash pipe and its supporting fishing unit 1 will position the threaded sub 8 into engagement with the stuck drill collar or fish 13, thereby providing a connection between the swivel housing 7, the safety stem 6 and the upper portions of the spear mandrel 5 with the stuck drill collar unit 13.

Figure 3:
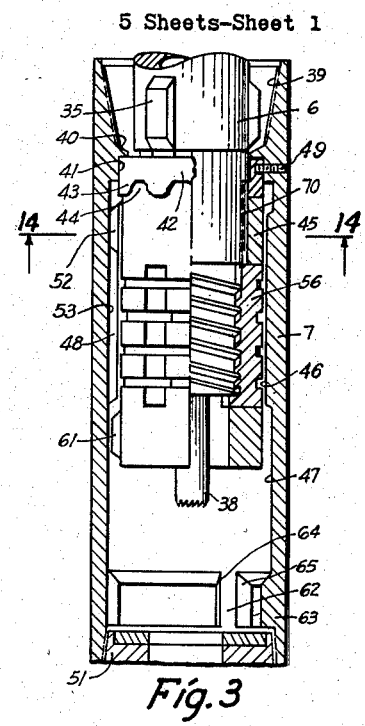
Figure 3 is a detailed sectional elevational view of the swivel barrel housing depicting the safety stem disposed in one position therein.

When the assemblies A and B are connected, and the stem 6 is in the automatic nut housing 45, it is positioned in the swivel housing 7 substantially as shown in Fig. 3. In this position, the dogs 52 are disposed in key slots 53 (Figs. 14 and 15) and the clutch teeth 43 and 44 are in engaging relation. During the threading of the pin 11 into an upper box (not shown) of the fish 13, the dogs 52 in key ways 53 will prevent any turning of the swivel housing 7. The efficient engagement of the slips 21 permits direct makeup of the pin 11 in a manner as will be hereinafter set forth. Once the sub 8 is made up with the stuck fish 13, a continued downward movement of the wash pipe 4 will provide a simultaneous downward movement of the upper slip cage housing 18 due to engagement of the friction dogs 19 with the wall of the wash pipe, thereby moving the engaging slips 21 (Fig. 5) downwardly away from the tapered seats 17 of the spear mandrel 5 and into a position of release or disengagement with the wash pipe 4 (Fig. 6). Upon release of the slips the upper unit A is free and the spear mandrel 5 and its connecting safety stem will move downwardly to position the engaged automatic nut housing 45 in the lowermost portion of the housing 7 (Fig. 4) placing the dogs 52 in the larger bore 47 of the swivel housing 7 so as to permit rotation therein. The expansible latches 61 operating the key ways 62 permit rotation in a right hand direction only.

Figure 4:
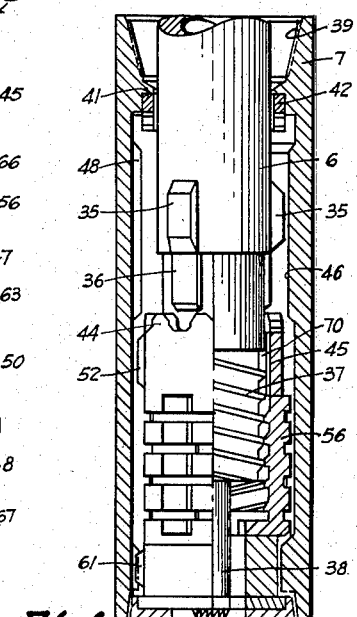
Figure 4 is a view similar to Fig. 3 showing another position of the safety stem in the swivel housing.

After the fishing tool is made up and the slips are released, the friction dogs 19 will cause a slight right hand torque of the tool unit 1 by rotation of the wash pipe 4. However, with the safety stem 6 and the housing 45 in the lowermost position such as shown in Fig. 4, the lugs 52 are disposed in the larger bore 47 of the swivel housing 7 permitting the unit to turn if desired. The expansible latches 61 are such that they move in and out of the one direction grooves 62 permitting a turning of the housing 45 due to rotational torque. The one directional turning is advantageous in order to maintain the safety stem 6 in the proper position and assure that the seating surfaces 17 will always be in position for alignment with the convex surfaces 25 of the slips, thereby assuring an efficient engagement of the slips when in an expanded position against the wash pipe 4. In this position of release, the wash pipe 4 and its reaming tool 9 may move vertically downward around the fish 13 for reaming out key seat portions around the stuck fish 13. The downward movement of the right hand rotating wash pipe 4 and the attendant reaming action of the reamer 9 will continue until the stuck fish 13 is loosened.

It will be apparent that with the unit in an operating position such as shown in Figs. 18 and 18A, the tool 9 in a combined rotary and downward movement will continue the reaming action until the fish 13 is in a loosened condition in the well bore. The upper fishing tool assembly A is connected through sub 8 to the fish 13 and immediately with the fish 13 becoming loosened, it will drop in a downward direction simultaneously moving the upper and lower assemblies A and B downwardly therewith. This movement of the unit 1 will move the tapered surfaces 17 of the spear mandrel 5 downwardly into contact with the inwardly positioned slips 21 (Fig. 6) to cause them to immediately expand outwardly into engagement with the wash pipe 4 (Fig. 5), thereby stopping any further downward movement of the loosened fish 13 and anchoring the fishing tool unit with its engaged drill collar therein for removal to the surface of the well. In such movement the slip housing 18 is temporarily stationary with the wash pipe 4 through engagement of the dogs 19.

*Releasing operation*

One of the important features of the present invention is the facility to disconnect and release for the removal of the reaming tool 9 and wash pipe, for inserting additional sections of the wash pipe that may be necessary to complete the reaming operation. In the event it is desired to release the upper section A, including the spear mandrel 5 and stem 6, from the lower section B, the wash pipe 4 is lifted vertically upward at the surface of the well. The frictional engagement of the dogs 19 on mandrel 5 against the wall of the wash pipe 4 (Fig. 11) is sufficient to maintain an engaged position of the housing 18 with the wash pipe, thereby moving the slip housing 18 simultaneously upward for positioning the slips 21 into contact with the tapered surfaces 17 of the spear mandrel 5, thereby expanding them outwardly into engagement with the wall of the wash pipe 4. In this manner, the upper unit A including the spear mandrel 5 and safety stem 6 are anchored with the wash pipe and continued upward movement of the wash pipe 4 will move the safety stem 6 and its connecting nut housing 45 upwardly within the swivel housing 7 to a position substantially as shown in Fig. 13. In this position the expansible friction dogs 35 on the stem 6 are positioned adjacent the inner periphery of the upper clutch ring 42, and since the inner diameter of the clutch ring is less than that of the friction dogs 35 in expanded position, the friction dogs are pressed inwardly along with the lower dog portions 36 (Figs. 1A and 13) which are simultaneously moved inwardly for freeing the dogs 36 from a locking engagement with a plurality of circumferentially spaced key ways 70 provided on the inner periphery of the housing 45 (Figs. 13, 14 and 15). In the initial connection of the stem 6 with the expansible slips 56, the lower dogs 36 are positioned into the plurality of key ways 70 in the upper portion of the housing 45, thereby locking the housing 45 against rotation with the stem 6. Referring to Fig. 13, with the dogs 35 pressed inwardly by the clutch ring 42, the lower dogs 36 are simultaneously released from the key ways 70, thereby freeing the safety stem 6 for rotation within the cage housing 45. The stem 6 and the left hand buttress threads 37 then may be unthreaded from the complementary threads 66 by rotation of the stem in a right hand direction for removal of upper unit A from lower unit B (Figs. 16 and 16A).

In such disjointed condition, the wash pipe 4 with its upper unit A may be removed from the well bore as desired and additional sections of wash pipe may be inserted in the wash string for a continued and deeper reaming action of the complete unit. When releasing the safety stem 6 from the housing 45, the housing is prevented from simultaneous rotation by the outer dogs 52 disposed in the longitudinal key ways 53 of the housing 7. In this manner, the threads 37 may be unthreaded from its complementary threads 66 without rotation of the housing 45.

When an additional section of wash pipe is added to the wash string, it is necessary to re-anchor or re-set the upper assembly A of the fishing tool 1 in the original section of wash pipe 4 so that upon reconnection of upper assembly A with the lower assembly B, the reaming tool 9 will be in substantially the same position, thereby assuring that the upper assembly A is engaged or connected with the lower assembly B before any reaming operation is started, and precluding any possibility of a reaming operation and the loosening of the stuck fish prior to a make up or connection of the fishing apparatus.

In the event it is desired to release the complete tool 1, including both the upper and lower assembly A and B, from the fish 13 (Figs. 17 and 17A), the wash pipe 4 is pulled vertically upward to provide engagement of the slips 21 therewith and anchoring of the unit 1 in the wash pipe. A continued upward movement of the wash pipe 4 pulls the safety stem 6 and the nut housing 45 upwardly in the swivel housing 7 to a position as shown in Fig. 3. In this position, the heavy duty clutch teeth 43 and 44 are in engaged position so that a left hand rotation of the complete assembly will unthread the lower sub 8 from the stuck fish 13 as clearly shown in Figs. 17 and 17A.

*Stripping operation*

In many fishing jobs a stripping operation is necessary for removal of the collars, particularly where there are several hundred feet of stuck drill collars supported by the wash-over tool 1 anchored in the wash pipe 4. Consequently in pulling the stuck collars from the well, it is necessary to strip each section of the wash pipe and supported drill collars upon coming out of the well bore. In order to prevent such a stripping operation, after the fish or drill collars 13 are loosened, a drill string 3 (Fig. 19) is lowered into the well bore from the well surface. The string 3 is provided with a coupling 72 at the lower end thereof having a lug extension 73 for connection with the upper J-slotted box 2 of the spear mandrel 5 thereby providing a connection between the drill string 3 and the wall hanger assembly or fishing unit 1. After connection of the drill string 3 and the upper unit A, including the spear mandrel 5, the entire string is moved upwardly with a simultaneous moving of the tapered seats 17 away from the expanded slips 21 providing an inward movement of the slips so that the fishing tool apparatus 1 connected with the loosened fish 13 is released from the wash pipe 4. The drill string 3 then may lower the complete fishing apparatus 1, including the connected and loosened collars 13, to a lowermost section of the wash pipe 4 where the wall hanger assembly or fishing tool apparatus 1 is then re-set and re-engaged with the wash pipe 4 in a manner heretofore mentioned. The drill string 3 is then disconnected from the box 2 and removed from the well bore. Following removal of the drill string 3, the upper sections of the wash pipe 4 may be removed from the well bore until the lowermost section anchoring the wall hanger unit, or fishing tool apparatus 1 and the connecting drill collars 13 are all removed.

During this stripping operation, the wash pipe 4 is hung from the surface of the well by a rotary table 74 by using suitable slips 75 (Fig. 19). In the stripping operation when the drill string 3 is moved upwardly for releasing the slips 21 from engagement with wall of the wash pipe 4, the lugs 31 (Figs. 1, 5 and 6) on the housing 18 are caused to move downwardly in the longitudinal slots 30 provided in the spear 5. In such position, a slight left hand rotation of the drill string 3 will move each of the lugs 31 into a horizontal slot 76 (Fig. 5) and under a shoulder 77 (Fig. 7) connecting with the slots 30, thereby assuring that the slips 21 are maintained in the released or disengaged position during a lowering of string 3 until there has been a resetting of the wall hangar assembly 1 in a lowermost section of the wash pipe 4.

Figure 8:
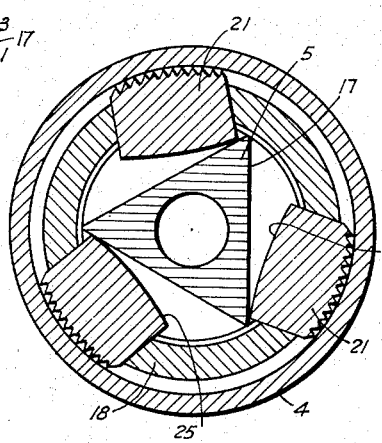
Figure 8 is a view taken on lines 8—8 of Fig. 7.

An important feature of the present apparatus is the locking operation of the slips 21 as shown in Figs. 8 and 9 with the spear mandrel 5 with the tapered seats 17 substantially adjacent the apertures or windows 20 (Figs. 1 and 5). The spear 5 at this point is of a substantially triangular shaped configuration providing a three sided spear having downwardly converging or tapered surfaces or seats 17. The rear or inner face 25 of each of the slips 21 is of a convex surface as clearly shown in Fig. 8 in order to provide a more efficient locking action thereof with the tapered seats 17. In this manner there is provided an effective locking engagement of the slips 21 with the wash pipe to provide a direct makeup connection between the stem 11 and the threaded box (not shown) of the stuck collar 13, thereby assuring that the threaded connection is complete and positive, without any disengagement of the slips from the wash pipe. The positive action also provides an effective retrograde movement of the stem in a release from the collar 13. It will be apparent that the rear tapered face 25 of each slip is provided with the convex surface or contour adapted to cooperate with the flat tapered surface 17 of the triangular configuration of the spear mandrel 5. This provides a tightening action of the slips for progressively increasing the engagement of the slips upon rotation of the wash pipe in either direction so that the makeup or release of any joint below the fishing tool apparatus may be done without the use of any special nipple or tool carried by the wash pipe for assisting in the making up or breaking of a connection below the fishing tool assembly such as stem 11 and drill collar 13. In this manner regardless of the rotation of the wash pipe 4 during engagement of the slips therewith, the variance of the radii of the convex surfaces 25 will maintain said convex surfaces in engagement with the tapered or flat seats 17 thereby maintaining an effective engagement of the slips at all times.

During the wash-over and reaming action, simultaneous rotation in a right hand direction only of the fishing apparatus is permitted by the expansible dogs 61 cooperating with the slots 62 which dogs 61 move into and out of the slots 62 during rotation of the pipe 4.

It will be apparent that the automatic nut housing holds the safety stem 6 in proper position for alignment of the seats 17 and actuation of the slips 21 with the wash pipe. Furthermore, any possibility of accidental disconnection of the upper assembly A from the lower assembly B is substantially eliminated. Once the stem 6 is moved upwardly, which is usually a distance of about twelve inches, thereby placing the dogs 52 in the key ways 53 and with the lower friction dogs 36 removed from the key ways 70 of the housing 45, the stem 6 is then in condition to be unthreaded from the housing 45. In this position, no more hunting by vertical or longitudinal movement of the stem will be necessary, and a right hand rotation of the wash pipe and its connecting stem will unthread the left hand threads 37 from the complementary nut threads 66, thereby disconnecting the stem 6 and upper unit A from the housing 45. This unthreading operation is accomplished without any additional longitudinal movement of the stem 6. Of course, as the stem 6 is being unthreaded, the nut housing 45 may be moved slightly downward in the swivel housing 7 to release the lower assembly B from the upper assembly A.

It will be apparent that it is necessary to rotate the stem 6 in one direction only for release of the connection between the upper assembly A from the lower assembly B, and substantially eliminate any possibility of any accidental disconnection therebetween. The direction of rotation is the same as that of the rotating wash pipe or in a right hand direction for release. However, upon re-assembling the threaded stem 6 with the automatic nut housing 45, the expansible function of the slips members 56 having the threads 66 permits vertical downward movement of the stem 37 without any rotation therebetween to provide the engagement or connection of the upper and lower units.

From the foregoing, it will be apparent that the present invention contemplates an apparatus for fishing or retrieving stuck drill collars and the like that are lodged in key-seated portions of an oil well bore, and the fishing apparatus is preferably combined with a wash-over pipe for connection with the stuck drill collar prior to a reaming by the reaming tool, and substantially instantaneously with a dislodgement of the stuck drill collar, the apparatus is automatically engaged with the wash-over pipe to prevent falling of the loosened pipe to the bottom of the well bore. The fishing apparatus is engageable with lodged drill collars prior to any initial reaming operation by the wash pipe reamer around stuck drill collars, thereby precluding any premature loosening of the stuck drill collars prior to positive engagement with the apparatus.

The present invention contemplates a fishing tool apparatus that permits alternate engagement and release thereof with the wash-over pipe without any possibility of accidental release of the gripping or engaged members due to rotating torque of the wash pipe during the reaming operation in the well bore. Furthermore, the apparatus simplifies the engagement and disengagement between the upper and lower assemblies of the apparatus, and particularly facilitates the release of the upper fishing tool stem from the lower assembly engaging the stuck drill collar in a manner that precludes any accidental disconnection of the assemblies until the operator is ready to release. Furthermore, the apparatus eliminates considerable vertical movement of the fishing tool assembly. In order to place the upper assembly in a position of release from the lower assembly, the upper unit is moved a definite and short distance in position to permit rotative release of the upper stem from the lower assembly which is connected with the stuck drill collars. Furthermore, the fishing tool apparatus is more positive in its operation in engaging and disengaging the complete apparatus with the stuck drill collar as well as releasing and reconnecting the assemblies of the fishing tool apparatus.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a lower swivel housing, means for supporting both the upper spear unit and lower swivel housing in an assembled relation in the wash-over pipe, means on the spear unit providing for alternate engagement and disengagement of the fishing tool assembly with the wash-over pipe, said means comprising a tubular housing surrounding the spear unit and carrying a plurality of movable slip members therein, a plurality of tapered surfaces provided on the spear unit and cooperating with the slips in one position of the spear unit relative to the tubular housing to cause outward movement of the slips into engagement with the wash-over pipe, and means on the slips cooperating with tapered surfaces to provide a progressive tightening of the slips due to rotation of the wash-over pipe.

2. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a lower swivel housing, means for supporting both the upper spear unit and lower swivel housing in an assembled relation in the wash-over pipe, means on the spear unit providing for alternate engagement and disengagement of the fishing tool assembly with the wash-over pipe, said means comprising a tubular housing surrounding the spear unit and carrying a plurality of movable slip members therein, a plurality of tapered surfaces provided on the spear unit and cooperating with the slips in one position of the spear unit relative to the tubular housing to cause outward movement of the slips into engagement with the wash-over pipe, each of said slips having a convex surface cooperating with the tapered surface to provide a progressive tightening of the slips due to rotation of the wash-over pipe.

3. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a lower swivel housing unit, means in the swivel housing unit providing a connection with the stuck drill collars, means on the spear unit providing for alternate engagement and disengagement of the fishing tool assembly with the wash-over pipe, said means comprising a tubular housing surrounding the spear unit and carrying a plurality of movable slip members therein, said spear unit having a substantially triangular shaped portion providing a plurality of tapered surfaces, said tapered surfaces cooperating with the slips in one position of the spear unit to cause an outward movement of the slips into engagement with the wash-over pipe, said slips having a convex shaped face portion cooperating with a tapered surface of the spear to a progressive tightening of the slips because of rotation of the engaged wash-over pipe.

4. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a connecting lower swivel housing unit, means carried by the swivel housing unit providing a connection with the stuck drill collars, means on the spear unit providing for alternate engagement and disengagement of the fishing tool assembly with the wash-over pipe, said spear unit having a lower threaded stem, means carried by the swivel housing providing a releasable connection with the upper spear unit, said means comprising a nut housing having means carried therewith to permit engagement of the threaded stem of the spear unit by a rectilinear movement thereinto, and means provided with the nut housing permitting release of the spear unit from the swivel housing by a rotative movement of the spear unit in one direction.

5. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a connecting lower swivel housing unit, means carried by the swivel housing unit providing a connection with the stuck drill collars, means on the spear unit providing for alternate engagement and disengagement of the fishing tool assembly with the wash-over pipe, said spear unit having a lower threaded stem, means carried by the swivel housing providing a releasable connection with the upper spear unit, said means comprising a nut housing having a plurality of circumferentially spaced expansible slip members carried by the nut housing for receiving the threaded stem by a rectilinear movement thereinto, and means provided with the nut housing permitting release of the spear unit from the swivel housing by a rotative movement of the spear in one direction.

6. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a connecting lower swivel housing unit, means carried by the swivel housing unit providing a connection with the stuck drill collars, means on the spear unit providing for alternate engagement and disengagement of the fishing tool assembly with the wash-over pipe, said spear unit having a lower threaded stem, means carried by the swivel housing providing a releasable connection with the upper spear unit, said means comprising a nut housing having a plurality of circumferentially spaced expansible members carried by the unit housing for receiving the threaded stem by a rectilinear movement thereinto, and means provided on the nut housing permitting release of the spear unit from the swivel housing by a rotative movement of the stem in one direction only, said nut housing having means cooperating with the swivel housing in one position therein to prevent rotation therebetween.

7. In an apparatus for retrieving stuck drill collars from a well bore comprising in combination a wash-over reamer pipe adapted to be telescoped over the stuck collars, a fishing tool assembly adapted to be releasably supported in the wash-over pipe, said fishing tool assembly comprising an upper spear unit and a connecting lower swivel housing unit, means carried by the swivel housing unit providing a connection with the stuck drill collars, means on the spear unit providing for alternate engagement and disengagement of the fishing tool assembly with the wash-over pipe, said spear unit having a lower threaded stem, means carried by the swivel housing providing a releasable connection with the upper spear unit, said means comprising a nut housing having a plurality of circumferentially spaced expansible members carried by the nut housing for receiving the threaded stem by a rectilinear movement thereinto, and means provided on the nut housing permitting release of the spear unit from the swivel housing by a rotative movement in one direction only, said nut housing having means cooperating with the swivel housing in one position therein to prevent rotation therebetween, and means in the swivel housing permitting rotation of the nut housing in the swivel housing in a position other than the first mentioned position of the swivel housing.

8. In a combined fishing and reaming apparatus for retrieving lodged drill collars from an oil well bore comprising a wash-over pipe adapted to be disposed in the bore and telescope over the collar, a tubular reamer on the lower end of the wash-over pipe for reaming therearound, a fishing tool assembly releasably supported in the wash-over pipe, said assembly comprising an upper spear unit and a lower swivel housing having a drill collar engaging mechanism carried thereby, a plurality of movable slip members surrounding the spear unit and cooperating with a plurality of tapered surfaces on the spear unit providing for alternate engagement and disengagement of the upper spear unit with the wash-over pipe, a lower threaded stem provided on said upper spear unit, means carried by the swivel housing and cooperating with the threaded stem to provide a releasable connection for the upper spear unit from the swivel housing, clutch dogs carried by the swivel housing and cooperating with companion clutch dogs carried by the last mentioned means to provide for a disengagement of the complete fishing tool assembly from the stuck drill collar by rotation of the wash-over pipe.

9. In a combined fishing and reaming apparatus for retrieving lodged drill collars from an oil well bore comprising a wash-over pipe adapted to be disposed in the bore and telescope over the collar, a tubular reamer on the lower end of the wash-over pipe for reaming therearound, a fishing tool assembly releasably supported in the wash-over pipe, said assembly comprising an upper spear unit and a lower swivel housing having a drill collar engaging mechanism carried thereby, a plurality of movable slip members surrounding the spear unit and cooperating with a plurality of tapered surfaces on the spear unit providing for alternate engagement and disengagement of the upper spear unit with the wash-over pipe, a lower threaded stem provided on said upper spear unit, a nut housing having means cooperating with the threaded stem providing a releasable connection for the upper spear unit from the swivel housing, clutch dogs carried by the swivel housing and cooperating with companion clutch dogs carried by the releasable connection means of the nut housing to provide for a disengagement of the complete fishing tool assembly from the stuck drill collar by rotation of the wash-over pipe, and means to prevent rotation of the nut housing during disengagement of the fishing tool assembly from the stuck drill collars.

10. In a combined fishing and reaming apparatus for retrieving lodged drill collars from an oil well bore comprising a wash-over pipe adapted to be disposed in the bore and telescope over the collar, a tubular reamer on the lower end of the wash-over pipe for reaming therearound, a fishing tool assembly releasably supported in the wash-over pipe, said assembly comprising an upper spear unit and a lower swivel housing having a drill collar engaging mechanism carried thereby, a plurality of movable slip members surrounding the spear unit and cooperating with a plurality of tapered surfaces on the spear unit providing for alternate engagement and disengagement of the upper spear unit with the wash-over pipe, a lower threaded stem provided on said upper spear unit, a nut housing carried by the swivel housing and having a plurality of expansible slip members cooperating with the threaded stem to provide a releasable connection therewith, flange means cooperating between the nut housing and swivel housing to prevent rotation of the nut housing during a releasing of the threaded stem therefrom, a plurality of spaced keyways provided on the nut housing, a plurality of circumferential friction dogs provided on the threaded stem and cooperating with the keyways provided on the nut housing to prevent rotation therebetween in one position of connection.

11. In a combined fishing and reaming apparatus for retrieving lodged drill collars from an oil well bore comprising a wash-over pipe adapted to be disposed in the bore and telescope over the collar, a tubular reamer on the lower end of the wash-over pipe for reaming therearound, a fishing tool assembly releasably supported in the wash-over pipe, said assembly comprising an upper spear unit and a lower swivel housing having a drill collar engaging mechanism carried thereby, a plurality of movable slip members surrounding the spear unit and cooperating with a plurality of tapered surfaces on the spear unit providing for alternate engagement and disengagement of the upper spear unit with the wash-over pipe, a lower threaded stem provided on said upper spear unit, means carried by the swivel housing and cooperating with the threaded stem to provide a releasable connection for the upper spear unit from the swivel housing, said fishing tool assembly adapted to connect with a drill string unit extending in the well bore above the assembly for lowering the released assembly and connecting collars to the lowermost portion of the wash-over pipe upon loosening of the stuck collars, a plurality of circumferentially spaced key slots provided on the stem unit and adapted to cooperate with a plurality of lug members for holding the slip members in a released position relative to the wash-over pipe during the lowering operation.

References Cited in the file of this patent
UNITED STATES PATENTS

| | | |
|---|---|---|
| 2,449,841 | Claypool et al. | Sept. 21, 1948 |
| 2,647,008 | Stewart et al. | July 28, 1953 |
| 2,762,438 | Naylor | Sept. 11, 1956 |